Jan. 2, 1951  G. WINTRISS  2,536,523
EYE ASSEMBLY FOR A DOLL'S HEAD
Filed Jan. 3, 1949  2 Sheets-Sheet 1
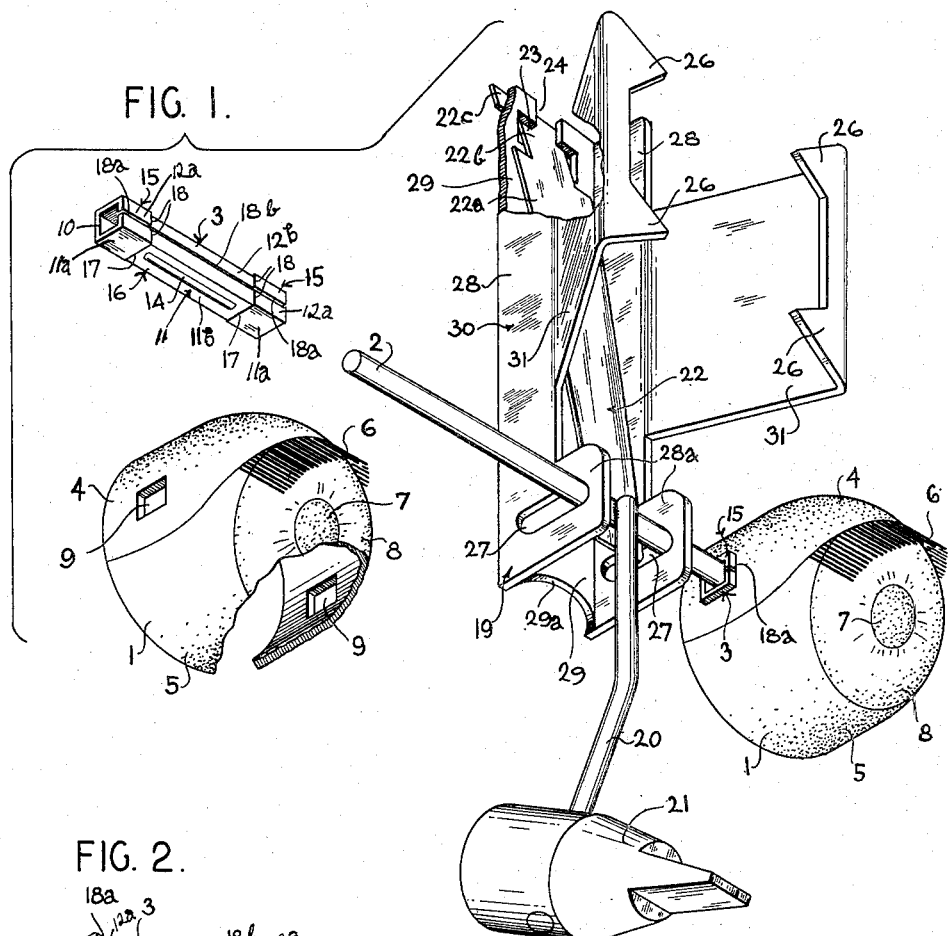
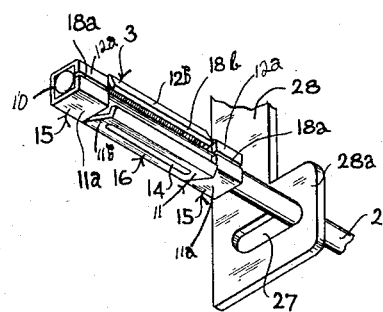
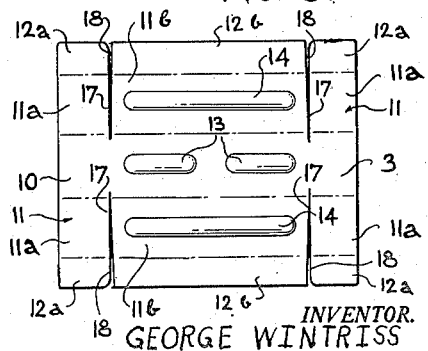
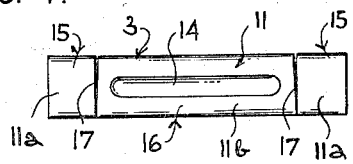
INVENTOR.
GEORGE WINTRISS
BY
Mock + Blum
ATTORNEYS.

Jan. 2, 1951     G. WINTRISS     2,536,523
EYE ASSEMBLY FOR A DOLL'S HEAD
Filed Jan. 3, 1949     2 Sheets-Sheet 2
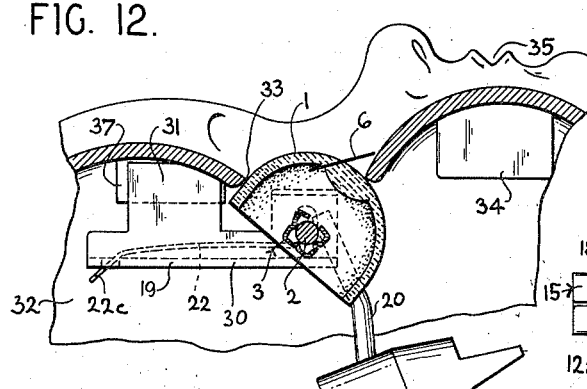
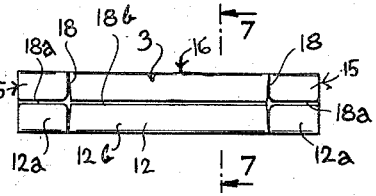
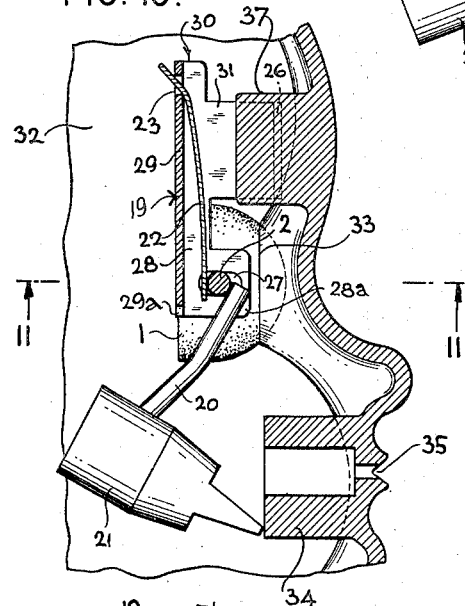
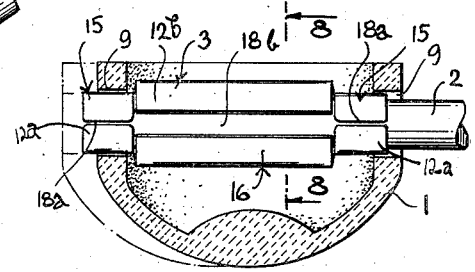
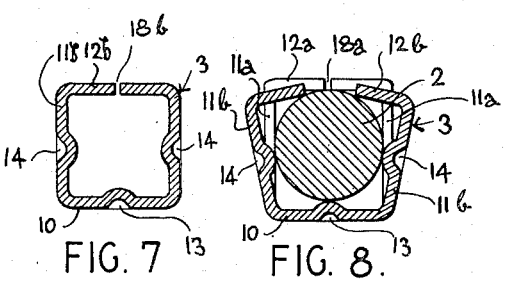
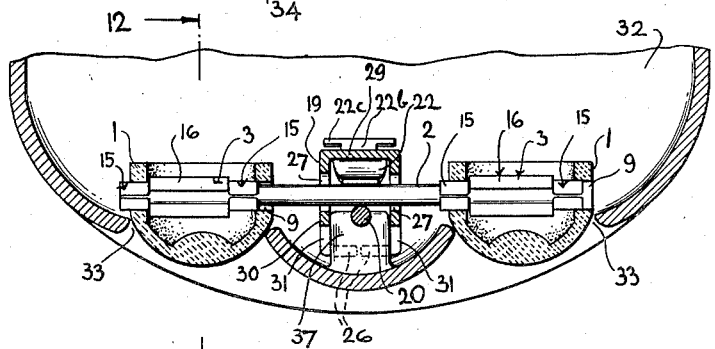
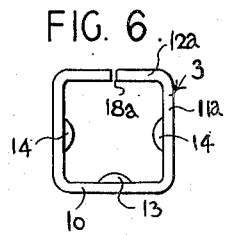
INVENTOR.
GEORGE WINTRISS
BY
Mock & Blum
ATTORNEYS.

Patented Jan. 2, 1951

2,536,523

UNITED STATES PATENT OFFICE 2,536,523

EYE ASSEMBLY FOR A DOLL'S HEAD

George Wintriss, Summit, N. J., assignor to Ideal Novelty & Toy Co., Hollis, N. Y., a corporation of New York Application January 3, 1949, Serial No. 69,007

9 Claims. (Cl. 46—169)

This invention relates to an improved eye assembly for a doll's head and an improved method of making the same.

In the art of constructing dolls' heads, it has been common to make eyes which would remain open when the doll was held erect and closed when the doll's head was tilted backwards. This has frequently been done by fixing the eyes to a cross-rod and suspending the same in the doll's head in such a manner that the rod was free to rotate about its axis, and suspending a weight from said cross-rod. The weight holds the eyes fixed in position when the doll's head is tilted backwards, thereby causing the eyes to close.

In the above art, it has always been a problem to provide a proper means for securing the eyes to the cross-rod. Dolls' heads are usually made of plastic materials and cannot be manufactured absolutely uniform in size, shape and configuration. Therefore, there must be a convenient and economical method to adjust the eyes in each individual head.

It is a primary object of this invention to provide a novel eye assembly for a doll's head, whereby individual adjustment of the eyes to fit the head may be easily made by movement of one or both of the eyes laterally along the axis of a cross-rod or rotatably with respect to said cross-rod.

It is a further object of this invention to provide an eye assembly for a doll's head, in which only one part is required to connect each eye to a shaft or cross-rod, whereby individual adjustment of the eyes to fit the head may be easily made by movement of one or both of the eyes laterally along the axis of said shaft or cross-rod or rotatably with respect to said shaft or cross-rod.

It is a further object of this invention to provide an eye assembly for a doll's head, which is economical and easy to construct, whereby adjustment of the eyes to fit each individual head may be readily made.

Other objects and other advantages are stated in the annexed description and drawings, which illustrate a preferred embodiment thereof.

Fig. 1 is a front perspective, enlarged and partially exploded view of the complete eye assembly. One sleeve is shown disassembled, and one eye is shown disassembled and partly cut away. Part of the clamping device is shown cut away;

Fig. 2 is a fragmentary, front perspective view showing the eye sleeve assembly without the eye attached;

Fig. 3 is a plan view of the sleeve blank, shown before it is bent into final shape;

Fig. 4 is a front elevational view of the unassembled sleeve;

Fig. 5 is a top plan view of the unassembled sleeve;

Fig. 6 is an end view of the unassembled sleeve;

Fig. 7 is a section of the unassembled sleeve taken along line 7—7 of Fig. 5;

Fig. 8 is a cross-section of the sleeve assembly which is formed when the sleeve is located on the cross-rod, taken along line 8—8 of Fig. 9;

Fig. 9 is an enlarged fragmentary view of one of the eyes shown in Fig. 11, the full-line position showing one extreme limit of lateral movement of the eye-shell on the sleeve, and the dotted-line position showing the other extreme limit of lateral movement of the eye-shell on the sleeve. This figure illustrates the increase in width of the slit portion 18b of sleeve 3, when sleeve 3 is assembled with shaft 2;

Fig. 10 is a vertical cross-section of the doll's head assembly, showing the eye assembly attached inside the doll's head, the latter being fragmentarily shown;

Fig. 11 is a sectional view taken along line 11—11 of Fig. 10; and

Fig. 12 is a sectional view taken along line 12—12 of Fig. 11.

Referring to the drawings, the eye-shell or eye-body is generally designated by the reference numeral 1, and it is attached to cross-rod 2 by means of sleeve 3. Said eye-shell 1 may be approximately in the shape of a hemispherical shell. It may have an upper eyelid portion 4 of one color; a lower body portion 5 of a contrasting color; eyelashes 6; a pupil 7; and an iris 8. These elements make the eye-shell 1 appear lifelike, but these features may be omitted or replaced by other features. Eye-shell 1 is provided with diametrically opposed non-circular and preferably square holes or openings 9 on opposite sides of its shell body, as is particularly shown in Fig. 1, for a purpose to be hereinafter described.

Fig. 3 shows the blank which is used to make the sleeve 3. Said blank is originally flat, and it is provided with the ribs or indentations 13 and 14, prior to bending the blank to form sleeve 3. Said blank has a longitudinal base 10, and transverse slits 17—18 which abut base 10, and may optionally extend into base 10. The sleeve 3 is thus provided with side-walls 11 which are perpendicular to base 10. The slits 17 divide said side-walls 11 into median portions 11b and end-portions 11a.

The top-walls which are formed by bending the blank of Fig. 3, have median portions 12b and end-portions 12a. The median top-wall portions 12b are integral with the median side-wall portion 11b, and the end top-wall portions 12a are integral with the end side-wall portions 11a. End top-wall portions 12a, end side-wall portions 11a and the portions of base 10 integral with end side-wall portions 11a, together comprise end portions 15 of sleeve 3. Median top-wall portion 12b, median side-wall portions 11b and the portion of base 10 integral with median side-wall portions 11a, together comprise center portion 16 of sleeve 3.

When sleeve 3 is initially formed from the blank of Fig. 3, said initially formed sleeve has the initial shape shown in Figs. 1 and 5, in which the median slit-portion 18b is very narrow, and the end slit-portions 18a are wider than said median slit-portion 18b. The walls of median slit-portion 18b may abut or substantially abut each other in the initially formed sleeve 3.

Sleeve 3 is non-circular and optionally substantially square in cross-section, with rounded corners. The end-parts 15 are just large enough in section to fit freely over shaft or rod 2.

Each sidewall 11b has centrally located longitudinal ribs or indentations 14 extending almost the entire length of said sidewall 11b, as is clearly shown in Fig. 4. Each such rib or indentation 14 is bent inwardly, as is clearly shown in Fig. 7. Bottom wall 10 is formed with two aligned and spaced inwardly bent ribs or indentations 13, approximately equal in size and extending lengthwise. As is clearly illustrated in Fig. 3, indentations 13 are located entirely within the median part of base 10 which forms the base of center part 16.

Indentations 13 and 14 are deep enough so that the cross-section of sleeve 3, taken at a plane such as is shown in Fig. 7, where the sidewalls and base have said indentations, is smaller than the cross-section of cylindrical rod or shaft 2. As a result, when sleeve 3 is forced onto shaft or rod 2, the end sections 15 fit closely but loosely on shaft 2, but sidewalls 11b and hence top wall portion 12b are forced outwardly to increase the width of slit portion 18b, as is particularly shown in Figs. 2 and 8. The indentations 13 and 14 are deep and large enough so that portions of sidewalls 11b now extend out substantially beyond sidewalls 11a. Sleeve 3 is made of any suitable metal or material which yields enough so that side walls 11b and top wall portions 12b will move laterally outwardly to enlarge slit 18b when said sleeve is forced onto rod 2. The metal or other material of sleeve 3 is sufficiently rigid so that it resists this outward movement. Therefore, the center part 16 expands as indicated above, when sleeve 3 is forced onto rod 2, but the said center part 16 continues to grip and frictionally engage rod 2 firmly, so that sleeve 3 will remain fixed in relation to rod 2. Once sleeve 3 is thus initially placed upon rod 2, sleeve 3 is thus locked to shaft 2 against axial movement, so that sleeve 3 does not shift axially relative to shaft 2 under ordinary conditions. However, sleeve 3 does not grip rod 2 so tightly as to prevent manual rotation of the sleeve 3 around the axis of the rod 2 in a manner to be described more fully hereinafter.

Each square hole 9 in eye 1 is sufficiently large so as to permit the respective end section 15 of sleeve 3 to pass readily therethrough. However, when sleeve 3 is placed on rod 2, the center portion 16 expands sufficiently and each hole 9 is sufficiently small so that the center portion 16 will not pass through the hole 9. This is clearly illustrated in Fig. 9. As is also particularly shown in Fig. 9, the thickness of the shell of eye 1 is less than the length of the end section 15 of sleeve 3. Furthermore, the external diameter of eye 1 is approximately equal to the length of sleeve 3.

In making the assembly, the end-portions of sleeve 3 are first located in the holes 9 of the eye-shell 1, while sleeve 3 has its initial shape of Figs. 1 and 5, and shaft 2 is then forced through the sleeve 3 to reshape the central part of sleeve 3 as shown in Figs. 8 and 9, so that eye-shell 1 now has only a limited axial movement of adjustment relative to its sleeve 3. That is, the transversely enlarged central portion of sleeve 3 limits the axial sliding movement of eye-shell 1 relative to its respective sleeve 3. Due to the interfitting square shape of holes 9 and the end-portions 15 of sleeve 3, the eye-shell 1 cannot rotate relative to sleeve 3. Also, while sleeve 3 can now be rotated and adjusted relative to shaft 2 by exerting sufficient force, sleeve 3 is not loosely turnable relative to shaft 2, so that sleeve 3 will remain in its adjusted circumferential position relative to shaft 2. That is, the frictional grip of the enlarged median part 16 of sleeve 3 on shaft 2 is sufficient to prevent free turning of sleeve 3 relative to shaft 2, while permitting forced manual circumferential adjustment of these parts.

Shaft 2, together with the two sleeves 3 and the two eyes 1, assembled as described above, are a part of the complete eye assembly 19. The eye assembly 19 consists of the following parts: eyes 1; sleeves 3; cross-bar 2; weight arm 20; weight 21; bridge or holder 30; and spring 22. Holder 30 comprises base 29; complementary side-walls 28; complementary clamps 31; and teeth 26.

As will be shown more fully hereinafter, holder 30 is intended to be assembled with the doll's head 32 so that holder 30 is approximately vertical when head 32 is vertical. Side-walls 28 are spaced and substantially parallel to each other and perpendicular to base 29. Side-walls 28 and base 29 together form a channel whose open end faces the front of the doll's head 32. A clamp 31 is integral with each wall 28 and as initially formed projects outwardly. Each clamp 31 has teeth 26 facing inwardly, the said teeth being substantially perpendicular to the clamp 31. Each wall 28 has a projection 28a at its lower end, said projection 28a extending toward the front of the doll's head 32. Each projection 28a has a through-and-through slot or opening 27. The length of each slot 27 exceeds its width. Its width is somewhat greater than the diameter of cross-bar 2. Lengthwise, slot 27 has a horizontal axis when head 32 is vertical. Cross-bar 2 passes freely through said slots 27. Weight-arm 20 is attached at one end thereof, in any convenient manner, to the center of cross-bar 2, said attachment point always being located between projections 28a. Weight 21, which may be of any appropriate shape, is secured in any convenient manner to the lower end of weight-arm 20. Each part of cross-arm 2 which is located outside of projections 28a has attached to it a sleeve 3 and eye 1, as heretofore described.

Base 29 has an upwardly curved recess 29a formed in its lower end, into which weight-arm 20 can fit when the doll's head 32 is tilted back from a vertical position to a rearward horizontal position. This limits the "roll" of the eyes 1, in a manner to be more fully described hereinafter.

The upper end of base 29 has formed therein an opening 23 which is rectangular in shape and has at its top an open neck 24 which extends through the top edge of the base 29. Opening 23 communicates with said neck opening 24. Blade spring 22 is a flat strip of metal, whose dimensions are slightly smaller than those of base 29, except near the upper end. At said upper end, the main body 22a of spring 22 is reduced to form a tongue 22b, and said spring 22 has a head 22c of the same width as body 22a. Head 22c is located rearwardly of base 29; neck 22b passes through opening 23 and main body 22a is located at the front of said base 29. The bottom end of spring 22 is located between base 29 and crossbar 2 and urges said cross-bar 2 away from said base 29 and therefore toward the front of the doll's head 32. Therefore shaft 2 may abut the front ends of slots 27 or be spaced rearwardly from the front ends of slots 27, depending on the adjustment in a respective head 32.

The arrangement of the eye assembly 19 in the doll's head 32 is shown in Figs. 10, 11 and 12. The assembly comprises eye assembly 19 and doll's head 32. Doll's head 32 may be made out of any suitable plastic or other material known in the art. It is formed with conventional eye sockets 33 and a ridge or boss 37 centrally located above the eye socket 33. Behind mouth 35 is projection 34. This may be used for any purpose known in the art, as for example, to serve as a guide in a manner not shown to lead a tube to mouth 35. In addition, projection 34 serves as a stop to halt the motion of weight 21 for a purpose to be explained shortly.

Ridge or projection 37 is of such shape that holder 30 may be secured to projection 37 by bending clamps 31 towards each other so that teeth 26 carried by said clamps 31 sink into said ridge 37. When the doll's head 32 is held in an erect position, holder 30 is also positioned vertically. Weight 21 tends to extend vertically downwards, but its motion toward that position is stopped when it strikes projection 34.

Each eye 1 may be manually rotated and adjusted with respect to rod 2, as described above, so that the iris 8 and eyeball 7 will be visible through socket 33 when doll's head 32 is held in an erect position and weight 21 abuts projection 34. In addition eyes 1 may be moved laterally with respect to holder 30 by moving cross-rod 2 and the assembled eyes as a unit, until the junction of weight-arm 20 and rod 2 strikes one of the projections 28a. Also each eye 1 is individually laterally movable relative to its sleeve 3 and hence along rod 2, as was explained above. It is therefore possible to center each eye 1 in its respective socket 33 prior to clamping holder 30 to projection 37. Spring 22 helps to hold eyes 1 firmly in sockets 33.

When doll's head 32 is tilted back, as when the doll is placed in a position of repose, weight 21 depends downwardly. This holds eyes 1 fixed in position as head 32 tilts. As a result, eyes 1 close. The eyes 1 cannot close too far (for example, thereby pushing eyelashes 6 into unnatural positions), because weight-arm 20 strikes the edge of indentation 29a of base 29 of holder 30. From then on, weight 21 turns as head 32 is tilted, and any further movement of eyes 1 relative to head 32 is impossible. Clearly, the eyes 1 can be made to go through all positions from completely open to completely closed, by proper tilting of head 32.

Numerous changes and omissions and additions can be made in the disclosure herein, without departing from the scope of the invention.

Thus, the sleeves 3 and shaft 2 may be shaped in any manner, so as to automatically laterally enlarge the median parts of sleeves 3 when sleeves are assembled with shaft 2.

I claim:

1. In an eye-assembly, a shaft which has an axis, a sleeve mounted on said shaft and having a median portion and end-portions, an eye-shell which has axially opposed openings, said end-portions being located in said eye-openings, said eye-openings and said end-portions being shaped to prevent said eye-shell from rotating relative to said end-portions, said shell being axially slidable relative to said end-portions, said median portion being shaped to limit the axial movement of said shell relative to said sleeve to keep both said end-portions in their respective eye-openings, said median portion being adjustably fixed to the respective part of said shaft to permit rotary adjustment between said median portion and said shaft.

2. In an eye-assembly, a shaft which has an axis, a sleeve mounted on said shaft, said sleeve being in one piece and being divided into a median portion and two-end portions by means of slits transverse to the longitudinal axis of said sleeve, said end-portions being located in said eye-openings, said eye-openings and said end-portions being shaped to prevent said eye-shell from rotating relative to said end-portions, said shell being axially slidable relative to said end portions, said median portion being shaped to limit the axial movement of said shell relative to said sleeve to keep both said end-portions in their respective eye-openings, said median portion being fixed to said shaft, said median portion being rotatably adjustable relative to said shaft.

3. A one-piece sleeve, said sleeve being divided into a center portion and two end-portions by means of slits transverse to the longitudinal axis of said sleeve, said center portion having a longitudinal slit extending its entire length, said center portion having indentations projecting inwardly.

4. In an eye assembly for a doll's head as described, a cross-rod, an eye in the form of a shell and a one-piece sleeve, said sleeve being mounted on said cross-rod and being divided into a center section and two end sections by means of two slits transverse to the longitudinal axis of said sleeve, said center section having a longitudinal slit running its entire length and having indentations projecting inwardly, said eye-shell having holes formed therein adapted to receive said sleeve and being mounted on same, said center section of said sleeve being located between the holes of said eye-shell and being shorter than the distance between same, each of said end sections of said sleeve passing through one of said holes, said end sections preventing rotation of said eye relative to said sleeve, said sleeve being the means whereby said eye is held on said cross-rod, said center-section expanding when said cross-rod is pushed through said sleeve so that said center section is unable to pass through said eye-shell holes.

5. In an eye assembly for a doll's head as described, a cross-rod, an eye in the form of a hemispherical shell and a one-piece sleeve for holding said eye on said cross-rod, said sleeve being mounted on said cross-rod and being divided into a center section and two end sections by means of two slits transverse to the longitudinal axis of said sleeve, said center section having a longitudinal slit running its entire length and having indentations projecting inwardly, said end sections being approximately square in cross-section, said eye-shell having two diametrically opposed square holes formed therein just large enough to permit ready passage of said end sections but small enough to prevent appreciable rotation of said end sections in same, said eye-shell being mounted on said sleeve by passing said sleeve through said holes in said eye-shell, said center section of said sleeve being located between said holes and being shorter than the distance between same, each of said end sections passing through at least part of one of said holes, said center-section of said sleeve expanding when said cross-rod is pushed through said sleeve so that said center section is unable to pass through either of said holes in said eye-shell.

6. In an eye assembly for a doll's head as described, a cross-rod, an eye in the form of a hemispherical shell, a sleeve substantially square in cross-section which is mounted on said cross-rod, said sleeve having a slit running longitudinally and centrally along the entire length of the top wall of said sleeve, said sleeve being divided into a center section and two equally complementary end sections by means of slits in the side wall and top wall, said slits being transverse to the longitudinal axis of said sleeve, said eye-shell having two square holes formed therein to permit ready passage of said end sections therethrough but small enough to prevent appreciable rotation of said end sections in same, said eye shell being mounted on the sleeve by passing said sleeve through said holes in said eye-shell, said center section of said sleeve being located intermediate said holes and being shorter than the distance between same, each of said end sections of said sleeve passing through at least part of one of said holes, said center section of said sleeve having indentations stamped into its walls and projecting inwardly, said end sections of said sleeve passing over said cross-rod, said center-section with said indentations being too small to pass over said cross-rod freely, said walls of said center section spreading outwardly when said cross-rod is pushed through said sleeve, said center section thereby expanding so that it will not pass through either of said holes in said eye-shell.

7. An eye-assembly as in claim 2, said center portion of said sleeve having a longitudinal slit extending its entire length, said center portion having ribs projecting inwardly.

8. An eye-assembly as in claim 2, said center portion of said sleeve having a longitudinal slit extending its entire length, said center portion having ribs projecting inwardly, the forcing of said shaft between said ribs causing the walls of said center portion to bend outwardly.

9. A doll's eye-assembly comprising a shaft, a sleeve which is mounted on said shaft and which has a center portion and end portions, an eye-shell which is mounted on said sleeve and which has respective openings through which said sleeve end portions respectively extend, said sleeve center portion being expanded outwardly when said shaft is pushed through said sleeve and serving as stop means to limit axial movement of said eye-shell relative to said sleeve whereby to prevent said eye-shell from slipping axially off said sleeve.

GEORGE WINTRISS.

REFERENCES CITED

The following references are of record in the file of this patent:

UNITED STATES PATENTS

| Number | Name | Date |
|---|---|---|
| 1,786,572 | Marcus | Dec. 30, 1930 |
| 1,792,176 | Marcus | Feb. 10, 1931 |
| 1,798,154 | Grubman | Mar. 31, 1931 |
| 2,155,081 | DeCesare | Apr. 18, 1939 |
| 2,197,765 | Marcus | Apr. 23, 1940 |